(12) United States Patent
Joshi et al.

(10) Patent No.: US 8,898,682 B2
(45) Date of Patent: Nov. 25, 2014

(54) COOLING IN HIGH-DENSITY STORAGE SYSTEMS

(75) Inventors: Shailesh N. Joshi, Houston, TX (US);
Richard Bargerhuff, Spring, TX (US);
Jeff Giardina, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1091 days.

(21) Appl. No.: 11/875,556

(22) Filed: Oct. 19, 2007

(65) Prior Publication Data
US 2009/0103414 A1   Apr. 23, 2009

(51) Int. Cl.
*G11B 33/14* (2006.01)

(52) U.S. Cl.
USPC ........................................ 720/600

(58) Field of Classification Search
None
See application file for complete search history.

(56) References Cited

U.S. PATENT DOCUMENTS

| 5,680,295 | A  | * | 10/1997 | Le et al. ................. | 361/695 |
| 5,971,804 | A  | * | 10/1999 | Gallagher et al. ......... | 439/581 |
| 6,274,807 | B1 | * | 8/2001  | Pommerenke et al. ..... | 174/384 |
| 6,300,847 | B1 | * | 10/2001 | Gallagher et al. ......... | 333/33  |
| 6,728,099 | B1 | * | 4/2004  | Tsang et al. ............. | 361/678 |
| 6,742,068 | B2 | * | 5/2004  | Gallagher et al. ......... | 710/302 |

\* cited by examiner

*Primary Examiner* — Mark Blouin

(57) ABSTRACT

In one embodiment an enclosure for a high-density storage system, comprises a backplane to which a plurality of data storage devices may be coupled, a front panel opposite the backplane and defining a first airflow channel adjacent a front side of the data storage devices, a back panel opposite the front panel and comprising a second airflow channel adjacent the backplane, a floor panel and a top panel, a first side panel comprising an array of air flow inlets, a second side panel comprising at least one air flow outlet, and a fan assembly to expel air from the at least one air outlet.

17 Claims, 4 Drawing Sheets

COOLING IN HIGH-DENSITY STORAGE SYSTEMS

BACKGROUND

Numerous storage medium carriers, such as data storage device carriers, exist in the computer industry. For instance, some storage medium carriers are adapted to mount within enclosures. Mounting of a storage medium carrier to an enclosure can provide various advantages. In particular, an enclosure-mounted carrier tends to be more secure than a non-enclosure-mounted carrier, in that the enclosure provides a protective barrier about the carrier. Enclosures, however, can be problematic.

By way of example, carriers mounted to enclosures can suffer from cooling deficiencies. More specifically, because an enclosure encases at least a portion of the carrier, the ability to remove heat from a carrier of an enclosure can be inhibited. Unless heat is removed from the carrier at a rate commensurate with the operating characteristics of the carrier, performance of the carrier can be reduced. In some cases, the inability to adequately remove heat from a carrier can result in failure of the ability of the carrier to store and/or retrieve data.

Therefore, there is a need for improved devices, systems, and methods that address these and/or other shortcomings of the prior art.

BRIEF DESCRIPTION OF THE DRAWINGS

The disclosed embodiments will be better understood from a reading of the following detailed description, taken in conjunction with the accompanying figures in the drawings in which.

DETAILED DESCRIPTION

Described herein are exemplary systems and methods for cooling in high-density storage systems. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
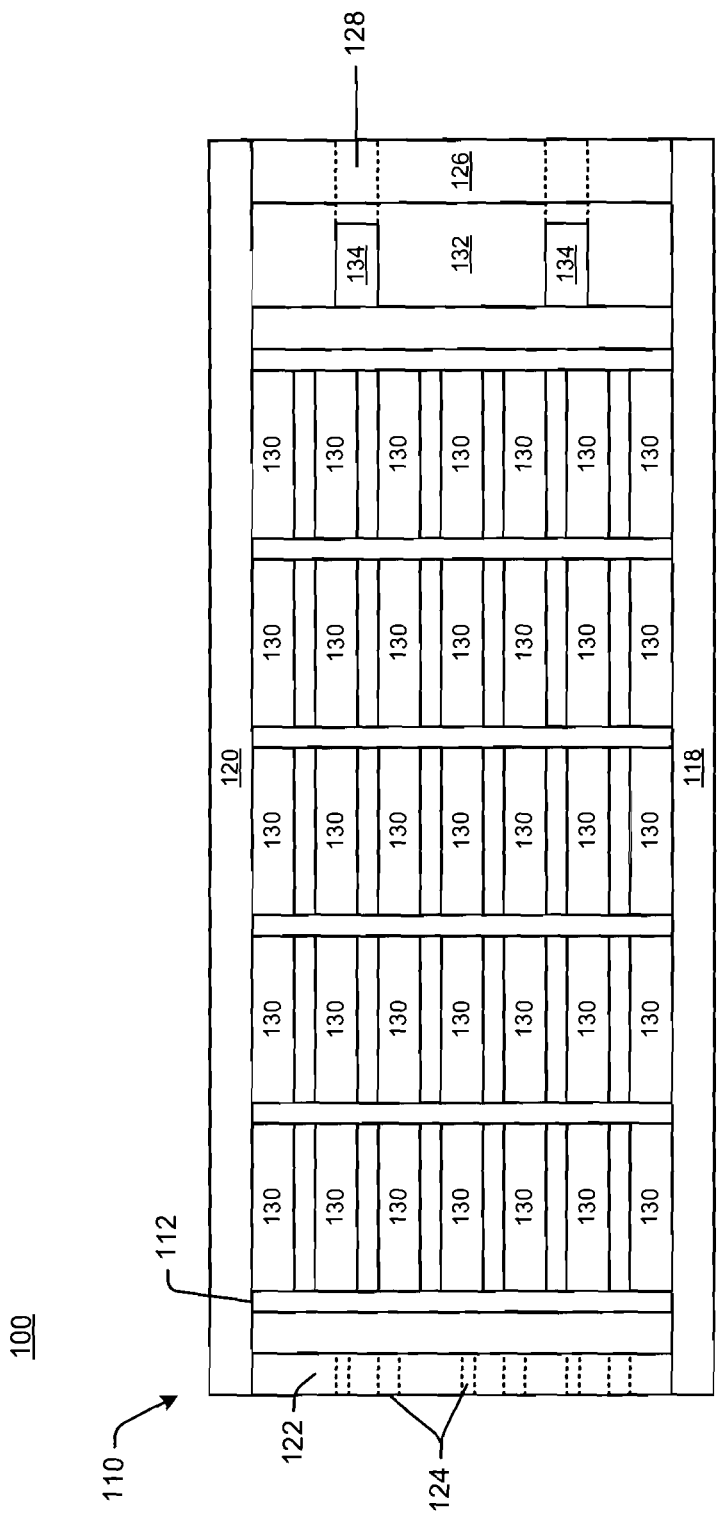
FIG. 1 is a schematic, side view illustration of a storage system, according to embodiments.
Figure 2:
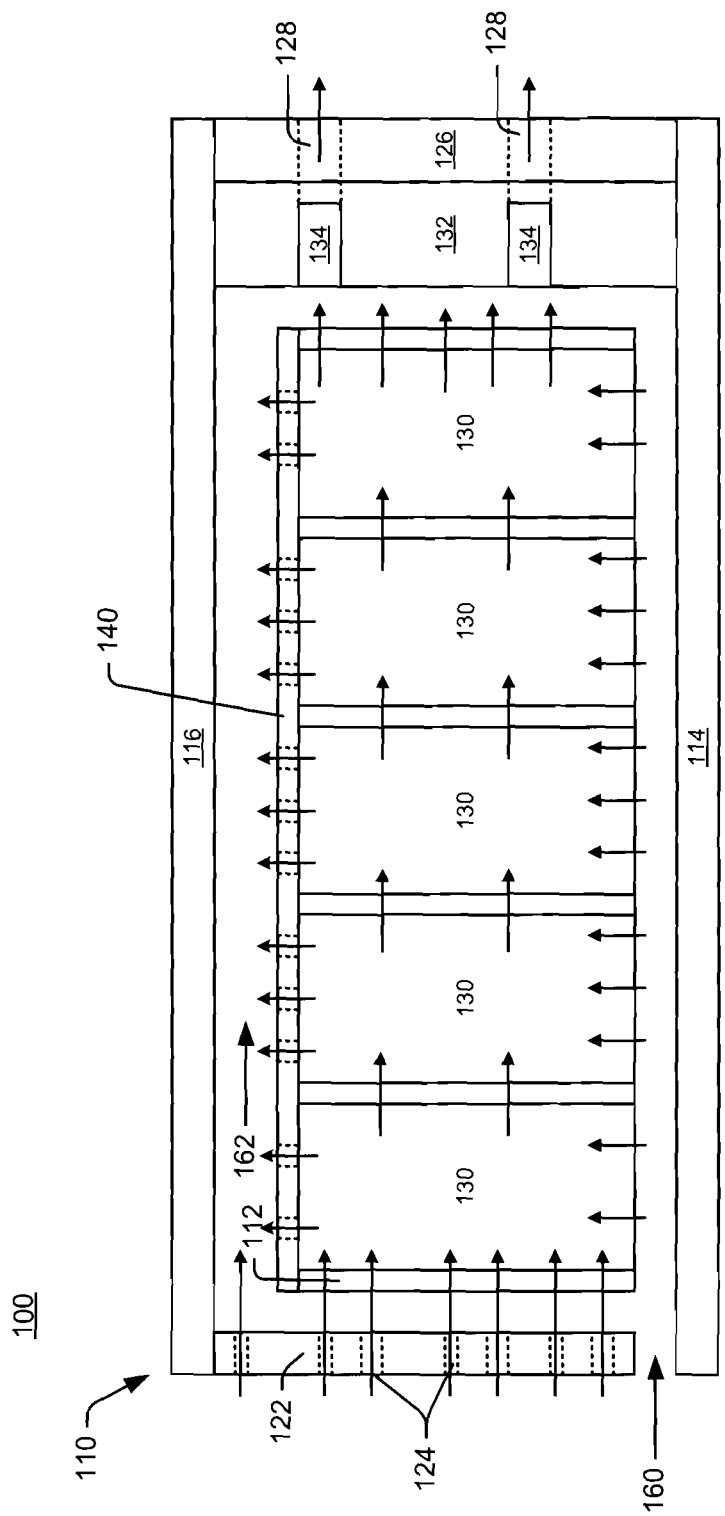
FIG. 2 is a schematic, top view illustration of a storage system, according to embodiments.

FIG. 1 is a schematic, side view illustration of a storage system, according to embodiments, and FIG. 2 is a schematic, top view illustration of a storage system, according to embodiments. Referring to FIGS. 1 and 2, a storage system 100 comprises a rack system 112 that holds a plurality of data storage devices 130, a enclosure 110, a backplane 140 to which the plurality of data storage devices may be coupled, and an enclosure 110 configured to hold the plurality of data storage devices. The enclosure comprises a front panel 114 opposite the backplane 140 and defining a first airflow channel 160 adjacent a front side of the data storage devices 130, a back panel 116 opposite the front panel and comprising a second airflow channel 162 adjacent the backplane, a floor panel 118 and a top panel 120, a first side panel 122 comprising an array of air flow inlets 124, second side panel 126 comprising at least one air flow outlet 128, and a fan assembly 132 to expel air from the at least one air outlet 128.

In one embodiment, the storage system depicted in FIGS. 1-2 may be implemented using standard 19 inch enclosures. One skilled in the art will recognize that the term "U" refers to a standardized storage space. In one embodiment, the enclosure 110 includes five columns, each of which holds up to seven storage devices in what is essentially a stacked, vertical orientation. Thus, the complete enclosure can hold up to 35 devices. The devices may be storage devices, alone or in combination with one or more controllers to manage operations of the storage system.

In the embodiment depicted in FIGS. 1-2 the enclosure 110 provides adequate space between the vertically stacked storage devices 130 such that air can flow between the devices. For example, in some embodiments, the enclosure provides between 0.87 inches and 0.1 inches of clearance between storage devices 130.

As used herein, the term "data storage device" refers to any device that is capable of storing data, such as a disk drive, CD ROM, or an opto-magnetic storage device, among others. In some embodiments a data storage device may be encased within a carrier, e.g., by a cover which is adapted to mate with the enclosure 110. In some embodiments, the data storage devices 130 may be managed by a storage controller to implement a pool of data storage which may be accessed through a host in a storage area network (SAN) configuration or in a network attached storage (NAS) configuration.

Front panel 114, back panel 116, side panels 122, 126, and floor panel 118 and top panel 120 define the enclosure 110. In the embodiment depicted in FIG. 2, the fan assembly 132 comprises two fans 134 adapted to expel air from the air flow outlets 128 in second side panel 126. The expulsion of air from enclosure 110 creates a low air pressure region within enclosure 110. Referring to FIG. 2, in one embodiment the front panel 114 and side panel 122 define an airflow channel 160 through which air may flow into the enclosure 110. In addition, the first side panel 122 comprises one or more apertures 124 through which air may flow into the enclosure 110.

Figure 3:
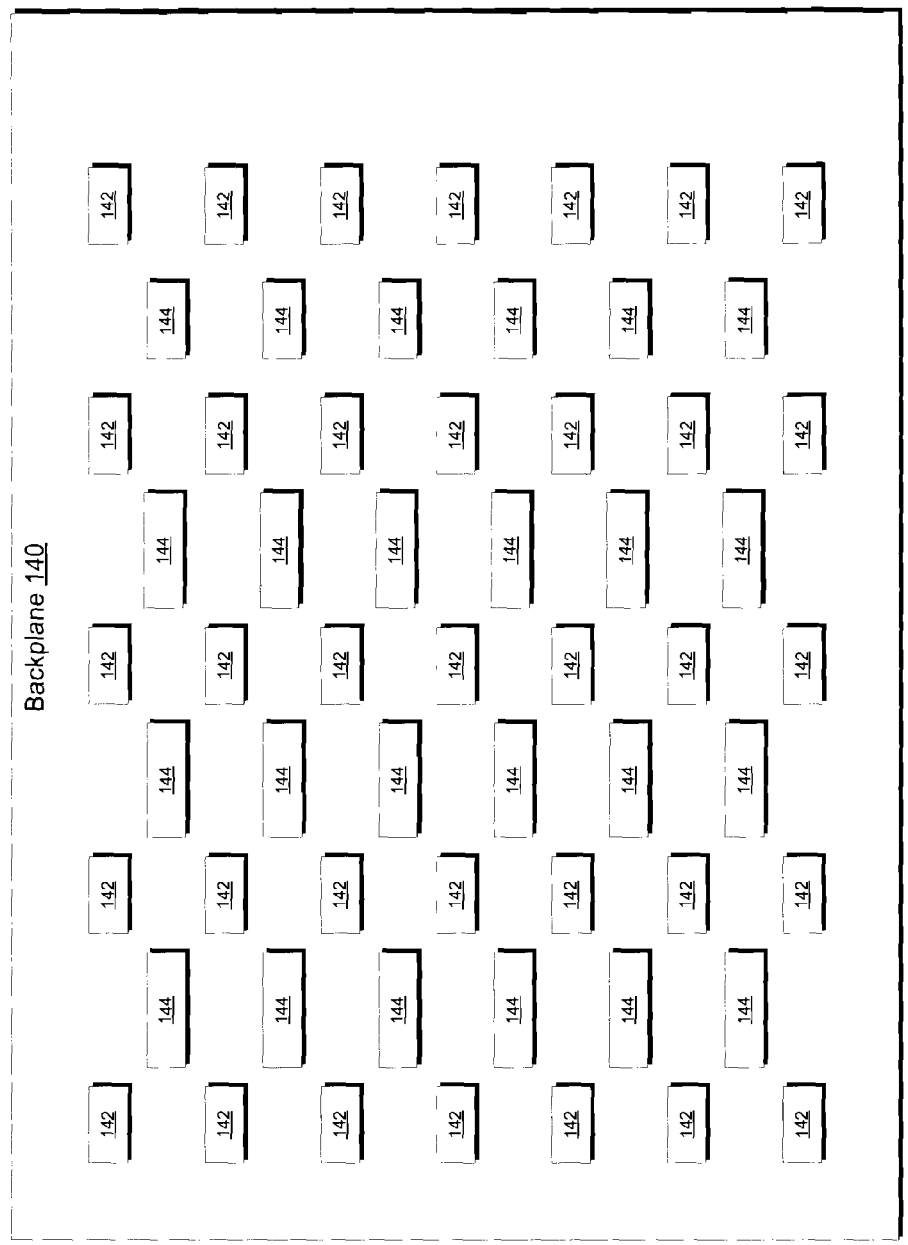
FIG. 3 is a schematic illustration of a backplane, according to embodiments.

FIG. 3 is a schematic illustration of a backplane 140, according to embodiments. Referring to FIG. 3, in some embodiments, backplane 140 comprises a plurality of interconnects 142 to provide physical and electrical interconnects with a data storage device 130 or other device (e.g., a controller) mounted on enclosure 110. One skilled in the art will recognize that backplane 140 may further comprise communication infrastructure to permit the data storage devices 130 to communicate with one or more controllers coupled to the backplane 140. Backplane 140 further comprises at least one array of airflow apertures 144 to enable airflow across backplane 140. In the embodiment depicted in FIG. 3, the airflow apertures are approximately uniform in their spacing, but vary in their size. In alternate embodiments, the airflow apertures 144 may be distributed in an irregular pattern across the back plane 140 and may be either uniform in size or may vary in size.

Thus, referring back to FIG. 2, in operation the fans 134 cause air to be drawn into enclosure 110 via air flow inlets 124 and airflow channel 160. Air enters the enclosure from the left-hand side as indicated by the arrows in FIG. 2. Within the enclosure 110, air flows across the surface of the data storage devices 130 in the storage enclosure 110 from multiple different directions. As indicated in FIG. 2, airflow from the apertures 124 inside panel 122 can flow straight across the surfaces of data storage devices 130. Air that flows into air flow channel 160 is allowed to flow laterally across the surfaces of data storage devices 130. Similarly, air that flows into air flow channel 162 is allowed to flow across the back plane 140 via the airflow apertures 144 such that this air can also flow laterally across the surfaces of data storage devices 130.

Figure 4:
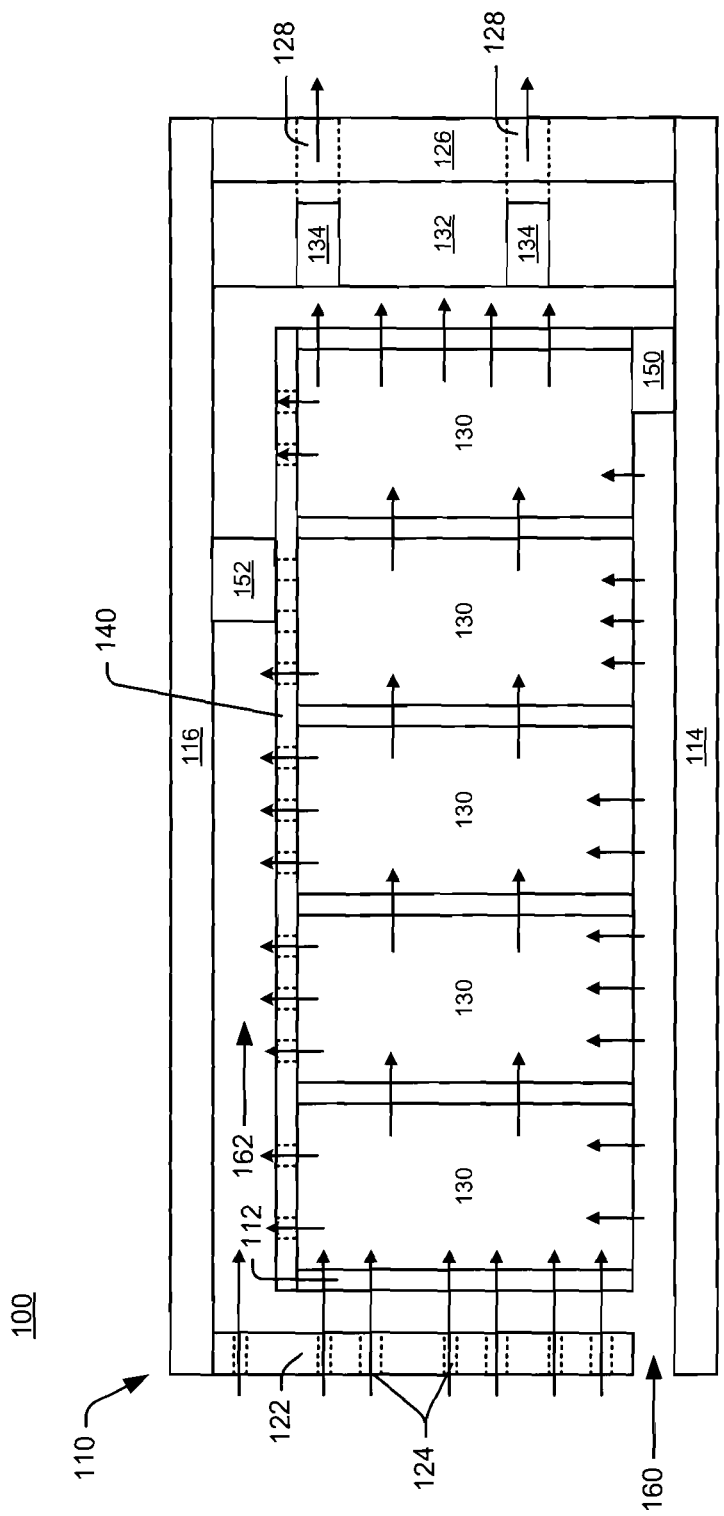
FIG. 4 is a schematic, top view illustration of a storage system, according to embodiments.

In some embodiments, one or more airflow blocking members may be introduced into the closure 100 to impede airflow to a portion of an airflow channel. For example, referring to FIG. 4, a first airflow blocking member 150 is positioned in the first airflow channel 160 to impede airflow through the channel. In some embodiments, the first airflow blocking member may be implemented as a vertically extending airfoil that secures either to the enclosure 110 or to the front panel 114 and which blocks airflow across at least a portion of the airflow channel 160. Thus, airflow in the regions downstream from the first airflow blocking member 150 is reduced.

Optionally, in some embodiments a second airflow blocking or 152 may be positioned in the second airflow channel 162 to impede airflow through the channel. In some embodiments, the second airflow blocking member 152 may be implemented as a vertically extending airfoil that secures either to the enclosure 110 or to the back panel 116 and which blocks airflow across at least a portion of the airflow channel 162. Thus, airflow in the regions downstream from the second airflow blocking member 152 is reduced.

In this document various positional terms (i.e., front, back, top, bottom, side, etc.) are used to describe specific panels on an enclosure. One skilled in the art will recognize that these terms are essentially arbitrary, and could be interchanged.

Reference in the specification to "one embodiment" or "an embodiment" means that a particular feature, structure, or characteristic described in connection with the embodiment is comprised in at least an implementation. The appearances of the phrase "in one embodiment" in various places in the specification are not necessarily all referring to the same embodiment.

What is claimed is:

1. An enclosure for a high-density storage system, comprising:
    a backplane to which a plurality of data storage devices may be coupled;
    a front panel opposite and substantially parallel to the backplane and defining a first airflow channel substantially parallel to a front side of the data storage devices;
    a back panel opposite and substantially parallel to the front panel and comprising a second airflow channel substantially parallel to the backplane;
    a floor panel and a top panel;
    a first side panel comprising an array of air flow inlets;
    a second side panel comprising at least one air flow outlet;
    at least one airflow blocking member to impede airflow; and
    a fan assembly to expel air from the at least one air outlet.

2. The enclosure of claim 1, wherein the backplane comprises a plurality of apertures to permit air flow across the backplane.

3. The enclosure of claim 2, wherein the at least one airflow blocking member is positioned in the first airflow channel to impede airflow through the first airflow channel.

4. The enclosure of claim 2, wherein the at least one airflow blocking member is positioned in the second airflow channel to impede airflow through the first airflow channel.

5. The enclosure of claim 2, wherein the plurality of apertures in the backplane are distributed in an irregular pattern across the backplane.

6. The enclosure of claim wherein the enclosure is adapted to hold a stack of data storage devices, and wherein the enclosure provide an airflow space between each the data storage device devices.

7. The enclosure of claim 1, wherein the fan assembly comprises a plurality of high-speed fans.

8. The enclosure of claim 1, wherein air flows through the enclosure in multiple different directions, including both substantially parallel and substantially perpendicular to the data storage devices.

9. A high-density storage system, comprising:
    a plurality of data storage devices;
    a backplane to which the plurality of data storage devices may be coupled;
    an enclosure comprising:
        a front panel opposite the backplane and defining a first airflow channel adjacent a front side of the data storage devices;
        a back panel opposite the front panel and comprising a second airflow channel adjacent the backplane;
        a floor panel and a top panel;
        a first side panel comprising an array of air flow inlets;
        a second side panel comprising at least one air flow outlet;
        at least one airflow blocking member positioned in the first airflow channel to impede airflow through the first airflow channel; and
        a fan assembly to expel air from the at least one air outlet.

10. The storage system of claim 9, wherein the backplane comprises a plurality of apertures to permit air flow across the backplane.

11. The storage system of claim 10, further comprising at least one airflow blocking member positioned in the second airflow channel to impede airflow through the first airflow channel.

12. The storage system of claim 10, wherein the plurality of apertures are distributed in an irregular pattern across the backplane.

13. The storage system of claim 9, wherein the enclosures provide an airflow space between each data storage device.

14. The storage system of claim 9, wherein the fan assembly comprises a plurality of high-speed fins.

15. The storage system of claim 9, wherein air flows throughout the enclosure from multiple different directions, including both substantially parallel and substantially perpendicular to the data storage devices.

16. A method to cool a high-density storage system, comprising:
    activating a fan system assembly to create a low pressure region within a storage enclosure;
        drawing air throughout the storage enclosure from at least two different directions;
        impeding an airflow path through the airflow channel; and
        expelling the air from an air outlet in the storage enclosure.

17. The method of claim 16, wherein drawing air into the storage enclosure from at least two different directions comprises drawing air from an airflow channel through at least one perforation in a backplane.

* * * * *

UNITED STATES PATENT AND TRADEMARK OFFICE
CERTIFICATE OF CORRECTION

PATENT NO. : 8,898,682 B2        Page 1 of 1
APPLICATION NO. : 11/875556
DATED : November 25, 2014
INVENTOR(S) : Shailesh N. Joshi et al.

It is certified that error appears in the above-identified patent and that said Letters Patent is hereby corrected as shown below:

In the Claims,

In column 4, line 4, in Claim 6, delete "claim" and insert -- claim 1 --, therefor.

In column 4, line 6, in Claim 6, delete "each the" and insert -- each of the --, therefor.

In column 4, line 7, in Claim 6, delete "device devices" and insert -- devices --, therefor.

In column 4, line 44, in Claim 14, delete "fins" and insert -- fans --, therefor.

Signed and Sealed this
Fifth Day of May, 2015

Michelle K. Lee
*Director of the United States Patent and Trademark Office*